US006782320B1

(12) United States Patent
Bahder

(10) Patent No.: US 6,782,320 B1
(45) Date of Patent: Aug. 24, 2004

(54) METHOD AND SYSTEM OF SINGLE-ANTENNA DETERMINATION OF POSITION, TIME, AND ATTITUDE OF A MOVING OBJECT BY SATELLITE NAVIGATION

(75) Inventor: Thomas B. Bahder, Clarksville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/146,119

(22) Filed: May 16, 2002

(51) Int. Cl.[7] ........................ G01C 21/26; G01C 21/00; G01C 21/28
(52) U.S. Cl. ..................... 701/213; 701/200; 73/178 R; 340/989; 340/988
(58) Field of Search ............................... 701/213, 200; 73/178; 340/988, 989

(56) References Cited

U.S. PATENT DOCUMENTS

| 5,243,530 | A | * | 9/1993 | Stanifer et al. ............. 701/219 |
| 5,359,521 | A | * | 10/1994 | Kyrtsos et al. ............. 701/215 |
| 5,446,465 | A | * | 8/1995 | Diefes et al. ........... 342/357.08 |
| 6,313,789 | B1 | * | 11/2001 | Zhodzishsky et al. . 342/357.12 |
| 6,441,779 | B1 | * | 8/2002 | Bennett et al. .......... 342/357.1 |
| 6,456,233 | B1 | * | 9/2002 | Zhodzishky et al. ... 342/357.02 |

OTHER PUBLICATIONS

Attitude Determination From Single–Antenna Carrier–Phase Measurements, Thomas B. Bahder, Journal of Applied Physics, Apr. 1, 2002.

* cited by examiner

Primary Examiner—William A. Cuchlinski, Jr.
Assistant Examiner—Olga Hernandez
(74) Attorney, Agent, or Firm—Edward L. Stolarun

(57) ABSTRACT

A system for determining position coordinates and attitude coordinates of a moving object employs a plurality of transmitters that transmit navigation signals, the transmitters having known positions and orientations in a given coordinate system. A single antenna that is carried by the moving object receives signals associated with far-field regions of electromagnetic fields of the navigation signals transmitted from the transmitters. A satellite receiver that is carried by the moving object obtains the signals received by the antenna. Phase difference circuitry derives a phase difference between an open circuit voltage of the antenna and a reference phase of a local oscillator in the receiver. A calculation circuit calculates position coordinates and three-dimensional attitude coordinates, within the given coordinate system, of the antenna relative to the transmitters based on the known positions and orientations of the transmitters and the phase difference obtained by the phase difference circuitry. The calculation circuit employs the current time and the position coordinates and three-dimensional attitude coordinates of the antenna in the given coordinate system to derive an attitude of the object relative to a topocentric coordinate system.

10 Claims, 2 Drawing Sheets

METHOD AND SYSTEM OF SINGLE-ANTENNA DETERMINATION OF POSITION, TIME, AND ATTITUDE OF A MOVING OBJECT BY SATELLITE NAVIGATION

BACKGROUND OF THE INVENTION

1. Field of Invention

This invention relates generally to the field of determination of position, time, and attitude by satellite navigation. More particularly, this invention relates to the basic operation of a single-antenna satellite receiver, such as a GPS receiver, to enable it to provide a user with position, time, and three-axis attitude information.

2. Description of Related Art

Ground-based navigation aide, such as VOR (VHF Omni-Range), and NDB (Non-Directional Beacons), as well as navigation by man-made Earth-orbiting satellites are known in the art. Conventional satellite navigation systems comprise three parts: a space segment consisting of Earth-orbiting satellites, a ground segment including a satellite tracking and control network, and a user segment including satellite receivers that users carry to receive the satellite signals. The satellite receivers contain proprietary circuitry and software that process the satellite signals and extract navigation information, such as the user's position, time, velocity, and attitude.

There are several satellite navigation systems in use today, such as the U.S. GPS (Global Positioning System) and the Soviet GLONASS system. There are also numerous new systems being planned, such as Europe's Galileo system, the Japanese MTSAT, and the European Geo-stationary Overlay System (EGNOS). In addition, there are planned augmentations of the existing systems in order to provide additional system capabilities. Examples of augmentations of the GPS are the FAA's (Federal Aviation Administration's) Wide Area Augmentation System (WAAS), and the FAA's Local Area Augmentation System (LAAS). The WAAS and LAAS augmentations are specifically intended for improving system accuracy and integrity for aviation applications. The industry for manufacturing GPS receivers is forecast to increase sharply in coming years.

Satellite navigation receivers provide the user with position, time, and velocity information. Additionally, three-axis attitude information is needed (e.g., specified in terms of three Euler angles) for guidance in numerous systems, such as unmanned aerial vehicles (UAV), missiles, aircraft, satellites, and for pointing communications antennas.

The prior art includes various (GPS) satellite receivers capable of delivering attitude information to a user. However, these receivers require signals from two or more well-separated antennas. When space requirements do not permit multiple well-separated antennas, a method using a single antenna is needed.

Furthermore, a single-antenna attitude determination system is preferable because it is potentially less expensive to manufacture and to install. A multiple antenna system with widely separated antennas must be wired together.

Another example where single-antenna attitude determination is beneficial is in general aviation aircraft. At present, the fleet of aircraft is in transition from ground-based navigation methods to satellite-based (mostly GPS) navigation. GPS receivers are being installed in many aircraft. A pilot needs attitude information whenever aircraft are flying in instrument meteorological conditions (IMC). Satellite attitude determination can be used as a primary attitude system, or alternatively, as an emergency backup when the primary attitude system fails. Since general aviation aircraft are currently in transition to navigation by GPS, many of these aircraft already have single-antenna GPS receivers. Therefore, it would be desirable to be able to extract attitude information from GPS data in existing GPS receivers. A single antenna receiver using a dipole antenna to determine attitude information is known. However, it restricts the kind of receiver antenna and can only determine two angles (out of three) of attitude. Dipole antennas cannot be miniaturized because they must be long to provide adequate sensitivity.

Full 3-axis attitude information about a platform contains compass heading information. Consequently, another application of attitude determination is to replace the wet compass. A miniaturized single-antenna system of attitude determination can be carried on a person. Therefore, a miniaturized attitude determination system has applications for land-based navigation for foot soldiers and civilians.

Prior art satellite navigation methods provide attitude information of the user platform (in addition to position and time), by utilizing two or more antennas to receive satellite signals. The difference in phase of the received signals (by the two or more antennas) is related to the range differences from the satellite to each antenna. The antennas must be widely separated, such as on the wing tips of an aircraft, in order to measure a phase difference associated with the time of flight of the signal from satellite to each of the receiving antenna. This technique is described and reviewed in detail in C. E. Cohen, "Attitude Determination, Chapter 19, in Global Positioning System: Theory and Applications vol. II"; B. W. Parkinson and J. J. Spilker, eds., "Progress in Astronautics and Aeronautics," vol. 163 and 164, American Institute of Aeronautics and Astronautics, Washington, D.C., 1996. Both of these references are incorporated by reference herein in their entireties. Essentially all satellite navigation receivers to date use this method, based on multiple antennas. Examples of GPS receivers that operate on the multiple antenna method of attitude determination described above are: the TANS Vector GPS receiver by Trimble Co. Inc., and the SS Loral Tensor GPS receiver. See also the web pages:

http://horse.mes.titech.ac.jp/srtlssp/HIEN/ENGLISH/system/gpsAtti.html, http://www.ee.surrey.ac.uk/SSC/SSHP/list/list_gps.html and http://www.esa.int/est/prod/prod0070.htm.

In addition to the above multi-antenna techniques of attitude determination mentioned above, Alfred Krall (ASEE) and the present inventor, Thomas B. Bahder (ARL), have filed three patent disclosures with the Army Research Laboratory legal office. These patent disclosures describe a single-antenna satellite method to determine receiver platform attitude (in addition to position and time). However, these three patent disclosures treat a specific, case, where the receiver antenna is a short dipole. A dipole-receiving antenna is rather unrealistic, since, in actual current application of satellite navigation, more compact (smaller size) and complex antennas are used. In addition, the algorithms of Krall and Bahder cannot be trivially extended to deal with more realistic antennas that currently are or would actually be used in practice for satellite navigation.

Furthermore, in these three patent disclosures by Krall and Bahder, the algorithms permit only a partial determination of attitude. Specifically, the algorithms of Krall and Bahder only permit determining two attitude angles, wherein a complete specification of attitude requires that three angles be determined. Their patent disclosures and Journal of Applied Physics article that describes their algorithm of attitude determination, is in "Orientation and velocity effects in the Global Positioning System" by Alfred B. Krall and Thomas B. Bahder, published in Journal of Applied Physics, vol. 90, No. 12, p.6513 (2001).

SUMMARY OF THE INVENTION

The present invention has three primary advantages over the prior art: it uses signals from a single antenna, an arbitrary type of receiving antenna can be used, even a short dipole, it allows miniaturization of the receiver, and all three Euler angles of attitude can be determined. A detailed technical description of this method has been has been described in an article submitted to Journal of Applied Physics, entitled "Attitude determination from single-antenna carrier phase measurements" by Thomas B. Bahder. (This article is scheduled for publication in Journal of Applied Physics in March or April 2002.)

Accordingly, the present invention is directed to single-antenna determination of position, time, and attitude by satellite navigation using a satellite receiver, such as a GPS receiver, which is capable of providing a user with position, time, and three-axis attitude information, while using signals from a single antenna.

The present invention determines position, time, and three degrees of freedom of attitude, from electromagnetic signals received by distant receivers. The transmitters can be on the ground, or satellites that orbit the Earth, such as GPS satellites. The present invention requires the user to have only a single antenna to track the satellite signals. The technique requires that the transmitters (e.g., satellites) are far from the user (observer), so the user's receiver is in the far-field region of the electromagnetic field of the navigation signals generated by the transmitters.

The present invention is applicable to all types of antennas for receiver and transmitter. It is based on comparing the phase of an open-circuit voltage in a receiver antenna, to a reference phase of a local oscillator in the receiver. The phase difference, between the open-circuit antenna voltage and the local oscillator, depends on the range to the transmitter and on the attitude of the receiving antenna with respect to the transmitter antenna. If the positions and attitudes of the transmitting antennas are known, then a user who is receiving signals from several transmitters can compute his position and attitude with respect to the transmitting antennas. When the positions and attitudes of the transmitting antennas are known in a coordinate system, e.g., the Earth Centered Inertial Frame (ECI), the receiver can determine its position, time and attitude in the same frame. Knowing the time, the receiver can then determine its attitude with respect to a topocentric coordinate system using a clock.

The transmitting antennas can be on navigation satellites, such as GPS, GLONOSS, Galileo, MTSAT or EGNOS. When position, time, and attitude must be determined, the minimum number of necessary signals is seven. This number of signals can be reduced to six, when for example, the oscillator is sufficiently accurate with respect to coordinate time of the navigation satellites, or one of the three Euler angles of the attitude to be determined is set to a constant, or when additional navigation systems (such as inertial navigation) are used to supply partial navigation information, such as one Euler angle of attitude. The signals can be adjusted to take into account a small effect from aberration of starlight, atmospheric time delay due to effective index of refraction of the atmosphere and Faraday rotation induced in the polarization vector due to the magnetic field of the Earth. The transmitting antennas can be replaced by a simulation system. This method of single-antenna attitude determination is also applicable as a basis for the construction of satellite simulators that will faithfully reproduce (simulate the effect on a received signal) the effects of attitude changes (in addition to position and time).

DETAILED DESCRIPTION OF THE PREFERRED EMBODIMENTS

Figure 1:
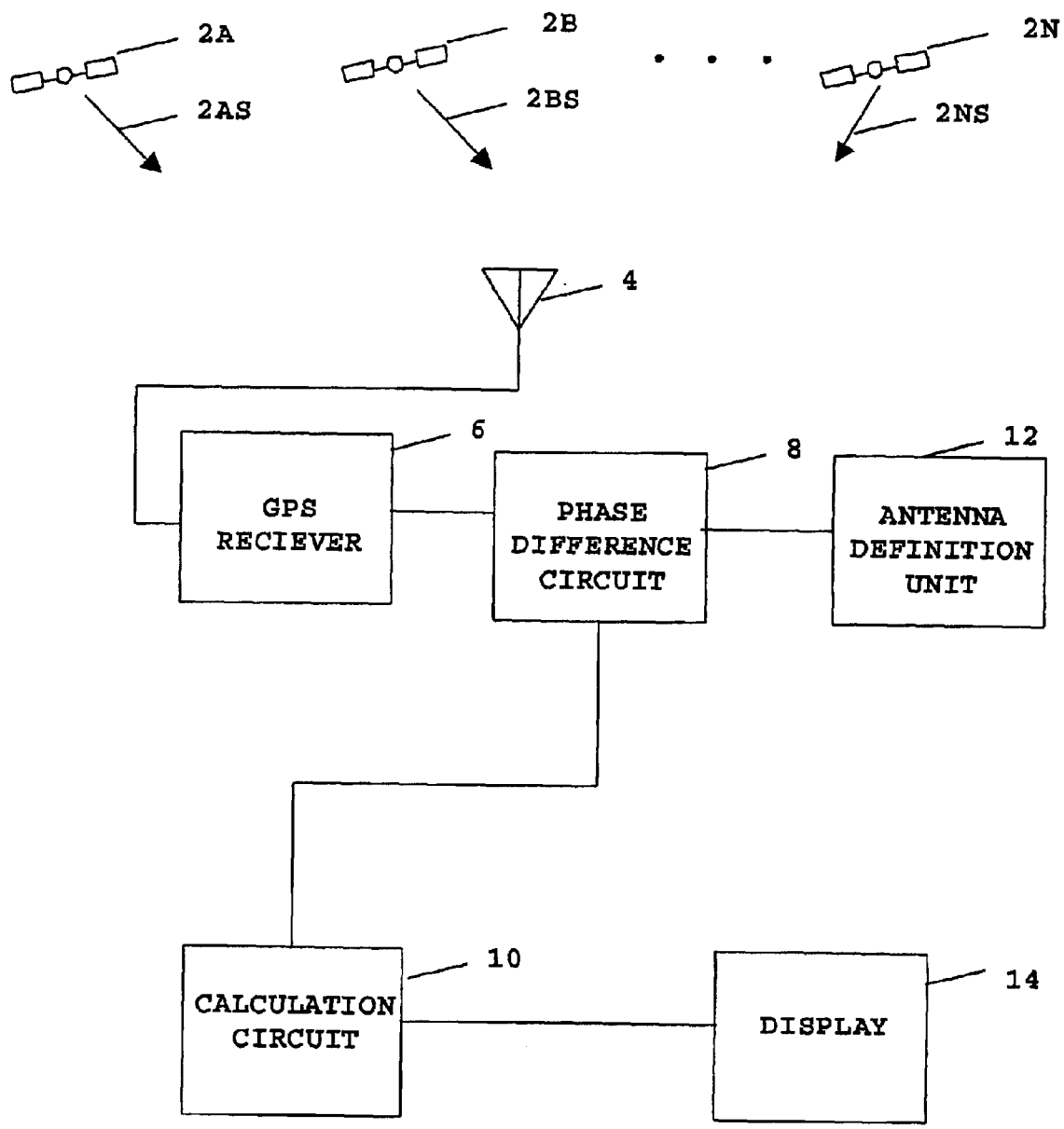
FIG. 1 is block diagram illustrating the present invention.

Current state-of-the-art in satellite navigation is exemplified by the GPS system. A GPS user receiver tracks either the pseudo-random noise code (making a pseudo-range measurement), or tracks the carrier phase (making a delta-range measurement). These raw measurements, either pseudo-range or carrier phase, are then processed to provide the user with navigation information, such as the user's position, time, velocity, and attitude. In the case of pseudo-range measurements, the state-of-the-art in this field is based on the equation for the time-of-flight of electromagnetic signals from satellite to receiver, given by $$|R_0 - R_T| = c(t_0 - t_T) \quad (1)$$

where the receiver is located at position $R_0$, in the Earth-centered (or other) inertial frame at time $t_0$, the satellite is at position $R_T$ at time $t_T$ and c is the speed of light. The distance or range r (in an inertial system of coordinates) that the signal travels between the satellite (at emission event time $t_T$) and the receiver (at reception event time $t_0$), is given by $$r = |R_0 - R_T| \quad (2)$$

When a GPS receiver makes delta-range measurements, the phase of the carrier is tracked with respect to the phase of a local oscillator in the receiver. The carrier phase is a scalar quantity that is given by $$\text{carrierphase} = kr - \omega t \quad (3)$$

where the electromagnetic wave vector magnitude is $k = \omega/c$, the angular frequency $\omega = 2\pi f$, where f is the L-band carrier frequency (approximately 1200 or 1500 MHz), and t is the time. It should be noted that in Eqs. (1) and (3), there is no use made of the fact that the electromagnetic field is a vector field. Eqs. (1) and (3) essentially treat the electromagnetic field as a scalar field that propagates at the speed of light c.

The present invention is a method for single-antenna determination of position, time, and attitude by satellite navigation according to which a satellite navigation receiver (e.g., a GPS receiver) will operate. Based upon the measured difference between the carrier phase (of the satellite signal) and the phase of a reference oscillator (and certain other quantities that are known in satellite navigation), the present invention provides the position, time, and three-axis attitude of the user platform. This invention exploits the fact that the electromagnetic field is a vector quantity. The basis of the method of the present invention is the general expression for the open-circuit voltage $V_s(t)$ induced in an antenna that is receiving electromagnetic signals from a satellite labeled by index s, $$V_s(t) = h(\theta_s, \phi_s) \cdot E(R_0, t) \quad (4)$$

where $h(\theta_s, \phi_s)$ is the receiving antenna "vector effective length" (or vector effective height) and $E(R_0, t)$ is the electric field at the receiver antenna at reception time t. The receiver is located at position $R_0$, in the Earth-centered (or other) inertial frame at time t. The electromagnetic field measured at the receiving antenna has propagated from the satellite transmitter to the user's receiving antenna. The direction of propagation, from satellite s to the receiver, as seen by the receiving antenna, is specified by the spherical polar angles $\theta_s$, and $\phi_s$, with respect to an origin O located at the position of the receiving antenna. This direction of propagation can also be specified by unit vector $n_s$, pointing from the satellite to the receiver.

The vector effective height in Eq. (4) is a two-dimensional vector field that describes the receiving properties of an arbitrary antenna. In general, the field $h(\theta, \phi)$ is specified on the unit sphere surrounding the receiving antenna, by two functions $$h_\theta(\theta, \phi) \text{ and } h_\phi(\theta, \phi)$$

$$h(\theta, \phi) = h_\theta(\theta, \phi)a_\theta + h_\phi(\theta, \phi)a_\phi \quad (5)$$

where $a_\theta$ and $a_\phi$ are unit basis vectors at the origin of coordinates, which is collocated with the receiving antenna. In practice, these two functions must be found by computation, or, by experiment. In the case of experiment, these two functions are found by mapping out the far-field pattern of the receiving antenna, when used in the transmission mode. Then, using the equation for the far-field $$E_a = E_\theta(\theta, \phi)a_\theta + E_\phi(\theta, \phi)a_\phi = -j\sqrt{\frac{\mu}{\epsilon}} \frac{kI_{in}}{4\pi r} h(\theta, \phi) e^{-jkr} \quad (6)$$

where $I_{in}$ is the current through the antenna, $\epsilon$ is the permittivity, $\mu$ is the permeability of the surrounding medium, r is the distance from the antenna, and $j = \sqrt{-1}$. The components of the vector effective height, $h_\theta(\theta, \phi)$ and $h_\phi(\theta, \phi)$, which are required parameters in the problem, can then be determined. It should be noted that this procedure is well defined for any type of receiving antenna.

The electromagnetic field of the satellite, at the position of the transmitter, is a far field. In this far-field region, the general form of the electromagnetic field at position $R_0$ at time t is given by the real part of $$E(R_o, t) = [uE_u(\Theta, \Phi)e^{\psi_u(\Theta, \Phi)} + vE_v(\Theta, \Phi)e^{\psi_v(\Theta, \Phi)}] \frac{e^{-jkr}}{r} e^{j\omega t} \quad (7)$$

where the vectors u and v are real, orthogonal unit vectors that specify the polarization of the field and the range r between reception event at the receiver and emission event at the satellite is given by Eq. (2). The quantities $E_u$ and $E_v$ are real amplitudes that depend on polar angles $\Theta$ and $\Phi$ measured from the origin at the satellite antenna. Each polarization can have an arbitrary phase $\psi_u$ and $\psi_v$. The field given by Eq. (7) is a general elliptically polarized electric field.

As an example of a specific case of Eq. (7), consider a GPS satellite, where the field near the central beam axis is a right circularly polarized field, given by $$E(R_o, t) = [u - jv]E(\Theta, \Phi) \frac{e^{-jkr}}{r} e^{j\omega t} \quad (8)$$

where $E(\Theta, \Phi)$ is the real amplitude. If the field broadcast by the satellite is not a right circularly polarized field, then Eq. (8) still applies, however, the vectors u and v will have complex phases, e.g., $u = u_0 e^{j\Phi_u}$ and $v = v_0 e^{j\Phi_v}$, where $u_0$ and $v_0$ are real orthogonal unit vectors. Consequently, no generalization is lost by using Eq. (8) for the form of the satellite field. This representation is used below.

The open-circuit voltage induced in the receiver antenna due to the electromagnetic field from satellite s, given in Eq. (4), can be written as $$V_s(t) = h_i(n_s(t))D_{ik}(t)\left[R_{1k}\left(t - \frac{r_s}{c}\right) - jR_{2k}\left(t - \frac{r_s}{c}\right)\right]E(n_s)\frac{e^{-jkr}}{r}e^{j\omega t} \quad (9)$$

where $n_s(t)$ is the unit vector from satellite s at position $R_s(t-r_s/c)$ at emission event time $t-r_s/c$, to the receiver at position $R_0(t)$ at reception event time t, given by $$n_s(t) = \frac{R_0(t) - R_s\left(t - \frac{r_s}{c}\right)}{\left|R_0(t) - R_s\left(t - \frac{r_s}{c}\right)\right|} \quad (10)$$

where the positions of the receiver $R_0(t)$ and satellite $R_s(t)$, are specified by their vector components in a Cartesian system of coordinates, such as the ECI coordinates (or other) inertial frame by $$R_0(t) = x_0^i(t)e_i \quad (11)$$

$$R_s(t) = x_s^i(t)e_i \quad (12)$$

where $e_i$, i=1, 2, 3 are Cartesian basis vectors in the ECI (or other) inertial co-ordinates, and $x_0^i(t)$ and $x_s^i(t)$, i=1, 2, 3, are the time-dependent coordinates of receiver and satellite, respectively, in the ECI (or other) inertial coordinates. Summation is implied when repeated indices occur, such as in Eq. (11) and everywhere in this text, unless stated otherwise. The range from a satellite, s, emission event to the reception event at the receiver, in ECI (or other inertial) coordinates is given by $$r_s(t) = \left|R_0(t) - R_s\left(t - \frac{r_s}{c}\right)\right| \quad (13)$$

The quantities $h_i(n_s(t))$ appearing in Eq. (9) are the components of the vector effective height of the receiving antenna projected onto the ECI (or other) coordinate basis vectors. These components depend on the direction $(\theta, \phi)$ from which the radiation from satellite s is incident on the receiving antenna. This direction can be specified by components of the unit vector $n_s(t)$, defined in Eq. (10). The components of the vector effective height, $h_i(n_s(t))$, on the ECI Cartesian coordinate basis vectors $e_i$ are given in terms of the spherical basis components in Eq. (5), by the following.

$$h(n) = h_\theta(\theta, \phi)a_\theta + h_\phi(\theta, \phi)a_\phi = h_1(n)e_1 + h_2(n)e_2 + h_3(n)e_3 \quad (14)$$

$$h_1(n) = h_\theta(\theta, \phi)\cos\theta\cos\phi + h_\phi(\theta, \phi)\sin\phi \quad (15)$$

$$h_2(n) = h_\theta(\theta, \phi)\cos\theta\sin\phi + h_\phi(\theta, \phi)\cos\phi \quad (16)$$

$$h_3(n) = -h_\theta(\theta, \phi)\sin\theta \quad (17)$$

In Eq. (9), the quantities $D_{ik}(t)$ specify the attitude of the body axis of the receiver platform, defined by Cartesian unit vectors $a_i$, i=1, 2, 3, with respect to the ECI Cartesian coordinate basis vectors $e_i$:

$$D_{ik}(t) = a_i(t)e_i \quad (18)$$

where the vectors $a_i(t)$ are time-dependent, since these vectors correspond to the moving body axis of the receiver.

The receiver platform attitude matrix $D_{ik}(t)=D_{ik}(\alpha(t), \beta(t), \gamma(t))$ has three independent parameters. This attitude matrix can be conveniently represented in terms of the time-dependent Euler angles, $\alpha$, $\beta$, and $\gamma$, by $$\begin{pmatrix} \cos\beta\cos\alpha\cos\gamma - & \cos\beta\sin\alpha\cos\gamma + & -\sin\beta\cos\gamma \\ \sin\alpha\sin\gamma & \cos\alpha\sin\gamma & \\ -\cos\beta\cos\alpha\sin\gamma - & -\cos\beta\sin\alpha\sin\gamma + & \sin\beta\sin\gamma \\ \sin\alpha\cos\gamma & \cos\alpha\cos\gamma & \\ \sin\beta\cos\alpha & \sin\beta\sin\alpha & \cos\beta \end{pmatrix} \quad (19)$$

The attitude matrix in Eq. (19) specifies the orientation of the basis vectors of the receiver platform, $a_i$, in terms of the ECI basis vectors $e_i$ (see Eq. (18)).

In Eq. (9), the quantities $$R_{1k}\left(t - \frac{r_s}{c}\right)$$

and $$R_{2k}\left(t - \frac{r_s}{c}\right)$$

specify the attitude of the satellite antenna polarization vectors, u and v, at the time of transmission, $$t - \frac{r_s}{c},$$

with respect to the ECI (or other) inertial frame Cartesian coordinate basis vectors $e_i$:

$$u\left(t - \frac{r_s}{c}\right) = (u \cdot e_m)e_m = R_{1m}\left(t - \frac{r_s}{c}\right)e_m \quad (20)$$

$$v\left(t - \frac{r_s}{c}\right) = (v \cdot e_m)e_m = R_{2m}\left(t - \frac{r_s}{c}\right)e_m \quad (21)$$

In Eq. (9), the remaining quantities to be defined are $$k_s = N_s \frac{\omega}{c} = \frac{2\pi N_s f}{c} \quad (23)$$

In the equation, $N_s = N_{s1} + jN_{s2}$ is the effective index of refraction (real and imaginary) of the medium through which the electromagnetic wave travels, from satellite transmitter to the user's receiver. The frequency f is the L-band (or other) carrier frequency.

The voltage in the receiving antenna due to signal from satellite s, given in Eq. (9), can be written as $$V_s(t) = v_s e^{-j\delta_s} E(n_s) \frac{e^{-jk_s r_s}}{r_s} e^{j\omega t} \quad (24)$$

where $v_s$, is the real amplitude and $\delta_s$, is a real phase angle, specified by $$\delta_s(t) = -\text{Arg}\left\{h_i\left(n_s(t)D_{ik}(t)\left[R_{1k}^{(s)}\left(t - \frac{r_s(t)}{c}\right) - jR_{2k}^{(s)}\left(t - \frac{r_s(t)}{c}\right)\right]\right\} \quad (25)$$

Here, for real numbers a and $\phi$, the function is $\text{Arg}(ae^{j\phi}) = \phi$ mod $2\pi$.

The measured voltage in the receiving antenna is the real part of Eq. (9) or (25), which can be written as $$\text{Re}V_s(t) = v_s \frac{E(n_s)}{r_s} \cos\psi_s(t) \quad (26)$$

$$\psi_s(t) = k_s r_s(t) - \omega t + \delta_s(t) \quad (27)$$

The phase $\psi_s(t)$ has the standard contribution due to scalar wave propagation, see Eq. (3), however, there is an additional phase shift, $\delta_s(t)$, which is a function of the relative orientation of the satellite antenna and receiver antenna.

The single-antenna attitude determination method exploits the dependence of the phase $\delta_s(t)$ on the relative orientation of the satellite and receiver antennas. It should be noted that $\delta_s(t)$ in Eq. (25) depends on receiver antenna parameters $h_i(n_s)$, which are defined in Eq. (15) through (17).

The satellite receiver should have a sufficiently stable electronic oscillator, which oscillates at a frequency $\omega = 2\pi f$. The phase change of this oscillator, since some arbitrary fiducial time $t_0$ can be represented by $$\Delta\psi_0(t) = -\omega(t^* + t_0) \quad (28)$$

where t is the GPS time (or coordinate time in the ECI (or other) frame of reference) that is associated with a time t* on the clock that counts oscillator cycles. It should be noted that an actual clock is not needed in the receiver to count oscillator cycles. The clock is a theoretical construct that is immaterial in the method. The oscillator in the user's receiver is assumed imperfect. The imperfection of the oscillator can be represented by the fact that the oscillator does not keep time according to ECI coordinate time. The oscillator will then have a running phase given by $$\psi_0(t) = -\omega t^* \quad (29)$$

where the time scale t* is not the same as the ECI coordinate time t. Assume that at the fiducial time $t_0$ the oscillator has the correct time $t^* = t_0$. If we counted the cycles of the oscillator since the fiducial time $t_0$, and multiplied by the period of the oscillator, $2\pi/\omega$, then the elapsed time, according to the oscillator, is $t^* - t_0$. The oscillator is assumed to have had the correct time at fiducial time $t_0$. The difference between the real ECI coordinate time elapsed, $t - t_0$, and the elapsed time as computed by counting oscillator cycles, $t^* - t_0$, is given by, $(t - t_0) - (t^* - t_0) = t - t^* \equiv \Delta t^*$ where $\Delta t^*$ is the oscillator clock bias that has accrued since the fiducial time. So the time kept by the oscillator, t*, and the coordinate time, t, are related by $$t^* = t - \Delta t^* \quad (30)$$

Using Eq. (30) in Eq. (28) gives the oscillator phase change since the fiducial time $t_0$ in terms of ECI coordinate time and the oscillator clock bias $$\Delta\psi_0(t) = -\omega(t - t_0 - \Delta t^*) \quad (31)$$

The phase of the voltage (due to satellite s) in the receiver antenna is given by Eq. (27). Since the fiducial time $t_0$ the phase of the voltage in the antenna changed by $$\Delta\psi_s(t) = \psi_s(t) - \psi_s(t_0) = k_s(r_s(t) - r_s(t_0)) - \omega(t - t_0) + \delta_s(t) - \delta_s(t_0) \quad (32)$$

The difference of the phase changes that have accrued on the receiver's oscillator (see Eq. (31)) and the carrier phase from satellite, s (see Eq. (32)), is the single antenna carrier phase-change equation $$\Delta\Psi_s(t) = \Delta\psi_s(t) - \Delta\psi_0(t) = k_s(r_s(t) - r_s(t_0)) - \omega\Delta t^* + \delta_s(t) - \delta_s(t_0) \quad (33)$$

Equation (33) gives the difference of the accrued phase changes in the oscillator and in the voltage of the receiver (due to signal of satellite s). This quantity is physically measured by tracking satellite signals. Equation (33), together with the above definitions, illustrates the method of the present antenna for single-antenna determination of position, time, and attitude by satellite navigation.

The measured phase change given by Eq. (33) depends on seven unknown parameters and several assumed-known parameters:

$$\Delta\Psi_s(x_0^k, \Delta t^*, \alpha, \beta, \gamma; x_s^k, R_{1k}, R_{2k}, \alpha_0, \beta_0, \gamma_0) \quad (34)$$

The unknown parameters at time t are the receiver antenna position, $x_0^k$, k=1, 2, 3, receiver oscillator phase correction $\omega\Delta t^*$ or receiver clock bias $\Delta t^*$, and the three Euler angles, $\alpha, \beta, \gamma$, which define the attitude matrix of the receiver. The parameters that are assumed known functions of time are the satellite position coordinates or ephemeris, $x_s^k$, k=1, 2, 3, and the satellite attitude parameters $R_{1k}$, $R_{2k}$, k=1, 2, 3. $x_s^k$, $R_{1k}$, $R_{2k}$ are collectively referred to as the satellite enhanced ephemeris. In addition, the receiver attitude at the fiducial time $t_0$ must be known through, for example, the Euler angles $\alpha_0$, $\beta_0$, and $\gamma_0$.

A user may exploit the general single antenna navigation system described above in several modes. The choice of mode depends on other systems that are available to the user, and what information the user requires. The most basic assumption is that the user has no additional systems for navigation. In this case, the user receiver determines the needed parameters at the fiducial time $t_0$, as well as the satellite-enhanced ephemeris, and then continuously tracks the carrier phase of seven satellites. At a given time t, the seven equations in Eq. (33), for s=1 . . . 7, are a closed system of equations that can be solved for the seven parameters of receiver position, $x_0^k$, k=1, 2, 3, receiver clock bias $\Delta t^*$, and the complete three-axis attitude given by the three Euler angles $\alpha$, $\beta$, and $\gamma$. The requirement that the user's receiver track seven satellites is not as severe as it may seem, because, for example, in the case of GPS, there are plans to provide additional satellites to the number that are currently operational.

Another mode of navigation is to carry an oscillator that is sufficiently stable over the intended time interval of navigation. For example, in the case of an unmanned aerial vehicle, the time of flight may be 10 minutes. An oscillator accurate to one part in $10^9$ would maintain a phase within $$\omega\Delta t^* = 2\pi(1200\ s^{-1})((600\ s)(10^{-9})) = 0.0045\ \text{radian} \approx 0.26°$$

If the oscillator is accurate enough, then the parameter $\Delta t^*$ does not have to be determined, and it is sufficient to track six satellites, and still obtain the coordinates of position and the three Euler angles of attitude.

Still another mode of navigation is to provide the user with compass heading information. The ability to determine three-axis attitude allows the extraction of the compass heading associated with a particular axis of the receiver platform. This requires a trivial transformation from ECI coordinates and time to topocentric coordinates.

In certain other scenarios, the user may be interested in attitude information of only a single axis. In this case, only two angles (of the three) are needed to specify the direction cosines of this axis, requiring tracking fewer satellites.

There are numerous other modes of navigation or navigation scenarios, and combinations of scenarios, that are useful for particular applications, where the number of satellites tracked are fewer than seven. This invention is applicable to all modes of navigation and navigation scenarios that deal with the basic method described above.

The method of the present invention may be implemented in a coded programmable electronic navigation computer, with a convenient display of the navigation parameters for the user. The method of the present invention may be applied in a variety of ways, e.g., to determine only position and time or to determine position, time and attitude. Alternatively, the invention may be used as part of a larger navigation system where certain navigation parameters are known, e.g., velocity and position. Thus, only time and attitude would be determined, leading to a corresponding reduction in the number of satellites that must be tracked to determine the parameters of interest.

FIG. 1 illustrates a representative embodiment of a system according to the present invention directed to determining position coordinates and attitude coordinates of a moving object. The system includes a plurality of transmitters 2A, 2B, . . . , 2N that transmit navigation signals 2AS, 2BS, . . . , 2NS. The transmitters have known positions and orientations in a given coordinate system, such as the Earth-centered inertial frame (ECI). An antenna 4 that is carried by the moving object receives signals associated with far-field regions of electromagnetic fields of the navigation signals 2AS, 2BS, . . . , 2NS transmitted from the transmitters 2A, 2B, . . . , 2N. A satellite receiver 6 that is carried by the moving object obtains the signals received by the antenna 4. Phase difference circuitry 8 derives a phase difference between an open circuit voltage of the antenna 4 and a reference phase of a local oscillator in the receiver 6. A calculation circuit 10 calculates position coordinates and three-dimensional attitude coordinates, within the given coordinate system, of the antenna 4 relative to the transmitters 2A, 2B, . . . , 2N based on the known positions and orientations of the transmitters 2A, 2B, . . . , 2N and the phase difference obtained by the phase difference circuitry 8. The calculation circuit 10 employs the current time and the position coordinates and three-dimensional attitude coordinates of the antenna 4 in the given coordinate system to derive an attitude of the object relative to a topocentric coordinate system. Calculation circuit 10 performs many of the calculations described above, such as range, position, time, vector effective length, open-circuit voltage, unit vector variables, among others, from the transmitting antennas signals 2AS, 2BS, . . . , 2NS and stores the results in memory. The phase difference circuit 8 preferably contains an oscillator and provides an oscillator phase change and oscillator clock bias in the memory. Antenna definition unit 12 may be employed to provide data particular to the kind of antenna 4 that is being used. The results from calculation circuit 10 may be displayed in a display 14 or may be used in other computations.

Figure 2:
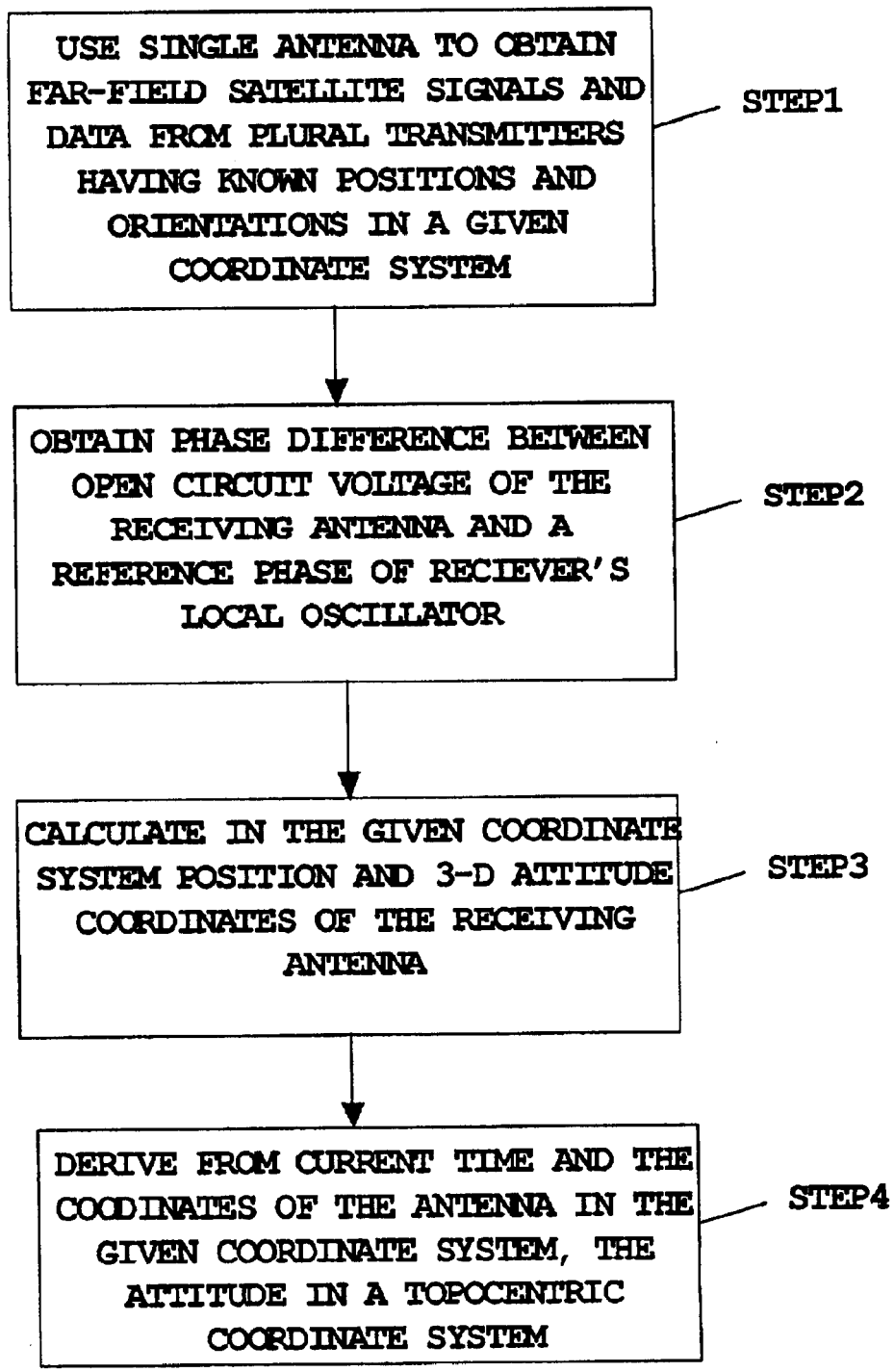
FIG. 2 is a flow chart illustrating the present invention.

FIG. 2 is a block diagram of the attitude determination method of the present invention. In Step 1, navigation signals transmitted from a plurality of transmitters having known positions and orientations in a given coordinate system are received by a single antenna of a receiver carried by a moving object, whose position and attitude coordinates are to be determined, to receive far-field region electromagnetic fields of the navigation signals transmitted from said plurality of transmitters. In Step 2, a phase difference is determined between an open circuit voltage of the single receiving antenna and a reference phase of a local oscillator in the receiver. Step 3 performs a calculation, in the given coordinate system, of position coordinates and three-dimensional attitude coordinates of the single receiving antenna relative to the transmitters based on the known positions and orientations of the transmitters and the previously obtained phase difference. Step 4 involves employing the current time and the position coordinates and three-dimensional attitude coordinates of the receiving antenna in the given coordinate system to derive an attitude of the object relative to a topocentric coordinate system.

The method makes use of the fact that satellite receivers, such as GPS receivers, can interpret transmitted signals and derive a variety of variables, such as position, time, range, etc. The clock ticks from the oscillator may be obtained and a clock bias calculated. All of the collected data may be used in the equations listed above to solve Equation (33). Various unknown parameters of Equation (33) can be set to a constant, reducing the number of transmitting antennas signals needed by the number of constants. It should be noted that most GPS receivers provide for multiple signal channels, i.e., receiving signals from multiple satellites simultaneously, and the attitude determination method of the present invention can be ported to these GPS receivers.

Improvements to the above system for single-antenna determination of position, time, and attitude, include taking into account the following small effects:

1. Aberration (direction of electromagnetic wave propagation, as seen by a moving observer).
2. Atmospheric time delay due to the effective index of refraction of the atmosphere. This time delay includes the delay of propagation through the troposphere and the delay of propagation through the ionosphere (correction based on either a two-frequency calculation, or, on a model of the ionosphere).
3. Faraday rotation induced in the (broadcast electromagnetic field) polarization vector due to the magnetic field of the Earth.

It is anticipated that the invention will make use of the above corrections.

From the above, it is apparent that the present invention is an improvement over prior art receivers requiring two or more antennas, because the present invention comprises utilizing signals from a single antenna of arbitrary type to compute the attitude, position and time of a user platform. Since this method works using signals from only a single antenna, the satellite receiver can be miniaturized, for example, to a hand-held size. Moreover, the present invention permits the use of any type of antenna for the receiving antenna and any type of antenna for the transmitting antenna and allows all three angles of attitude to be determined.

The present invention is quite general and has numerous applications for determining position, time, attitude, and compass heading. It has uses in the following areas (but is not limited thereto):

1. Aircraft navigation (both fixed-wing and rotary-wing) to determine attitude and compass heading, for general navigation and for navigation in Instrument Meteorological Conditions (IMC).
2. Unmanned aerial vehicles (UAV) for complete navigation (position, time, attitude, and heading), or, to interface with an inertial, or other, navigation system.
3. Ships and boats, for attitude, navigation and compass heading.
4. Unmanned ground vehicles, for complete navigation (position, time, attitude, and heading), or, to interface with an inertial, or other, navigation system.
5. Earth orbiting satellites and micro-satellites (e.g., below GPS or other navigation satellites) for complete navigation (position, time, attitude, and heading), or interface with inertial and other navigation systems.
6. Miniaturized compass and navigation tool for carrying on a person (such as a foot soldier or hiker) to provide position, time, attitude and/or compass heading.
7. As an integrated information tool that is integrated into a larger system, such as a command and control information system for battlefield commands, that gives the attitude and position of soldiers on the battlefield. Attitude information is useful for knowing the status of the forces.

The modifications to existing methods will provide attitude using a single satellite antenna. This permits miniaturization of the receiver system. Full 3-axis attitude information is provided. Any type of antenna can be used for the receiver and satellite transmitter, and the antenna is not limited to a short dipole antenna. The antenna can be tailored to the needs of the satellite and user. For example, certain types of antennas are preferred to minimize unwanted jamming of the satellite signals or other types of antennas desired by the implementation.

Although the present invention has been fully described by way of examples with reference to the accompanying drawings, it should be understood that numerous variations, modifications and substitutions, as well as rearrangements and combinations, of the preceding embodiments will be apparent to those skilled in the art without departing from the novel spirit and scope of this invention.

What is claimed is:

1. A method for determining position coordinates and attitude coordinates of a moving object relative to a plurality of transmitters comprising:

(a) transmitting navigation signals from a plurality of transmitters having known positions and orientations in a given coordinate system;

(b) employing an antenna of a receiver carried by said moving object to receive far-field region electromagnetic fields of said navigation signals transmitted from said plurality of transmitters which contain phase information representing the relative orientation of the receiving antenna with respect to the transmitting antennas;

(c) obtaining a phase difference between a reference phase of a local oscillator and the phase information associated with the signal from each transmitter; and (d) calculating, in said given coordinate system, position coordinates and three-dimensional attitude coordinates of said antenna relative to said transmitters based on said known positions and orientations of said transmitters and said phase difference obtained in step (c).

2. The method of claim 1, further comprising employing the current time and said position coordinates and three-dimensional attitude coordinates of said antenna in said given coordinate system to derive an attitude of said object relative to a topocentric coordinate system.

3. The method of claim 1, wherein said transmitters are mounted on respective satellites.

4. The method of claim 1, wherein said transmitters are mounted on the Earth.

5. A system for determining position coordinates and attitude coordinates of a moving object, said system comprising:

(a) a plurality of transmitters that transmit navigation signals, said plurality of transmitters having known positions and orientations in a given coordinate system;

(b) an antenna that is for being carried by the moving object and that receives signals associated with far-field regions of electromagnetic fields of said navigation signals transmitted from said plurality of transmitters which contain phase information representing the relative orientation of the antenna with respect to the transmitters;

(c) a receiver that is for being carried by the moving object and that obtains said signals received by said antenna, said receiver including a local oscillator; and (d) phase difference circuitry that derives a phase difference between an open circuit voltage of said antenna and a reference phase of said local oscillator in said receiver; and (e) a calculation circuit that calculates position coordinates and three-dimensional attitude coordinates, within said given coordinate system, of said antenna relative to said transmitters based on said known positions and orientations of said transmitters and said phase difference obtained by said phase difference circuitry.

6. The system of claim 5, wherein said calculation circuit employs the time and said position coordinates and three-dimensional attitude coordinates of said antenna in said given coordinate system to derive an attitude of said object relative to a topocentric coordinate system.

7. The system of claim 5, wherein said transmitters are mounted on respective satellites.

8. The system of claim 5, wherein said transmitters are mounted on the Earth.

9. The method of claim 1, wherein the calculating of the position coordinates and three-dimensional attitude coordinates is done by solving several equations of the form, $$\Delta\Psi_s(t)=k_s(r_s(t)-r_s(t_0))-\omega\Delta t^*+\delta_s(t)-\delta_s(t_0)$$

wherein $\Delta\Psi_s(t)$ is the obtained phase difference of step (c), and $\delta_s(t)$, $r_s(t)$, $k_s$ are functions of the variables we seek: receiver antenna position, $x_0^k$, k=1, 2, 3, and 3-dimensional receiver antenna attitude specified by the three Euler angles, $\alpha$, $\beta$, $\gamma$.

10. The system of claim 1, wherein the calculating of the position coordinates and three-dimensional attitude coordinates is done by solving several equations of the form, $$\Delta\Psi_s(t)=k_s(r_s(t)-r_s(t_0))-\omega\Delta t^*+\delta_s(t)-\delta_s(t_0)$$

wherein $\Delta\Psi_s(t)$ is the obtained phase difference of step(d), and $\delta_s(t)$, $r_s(t)$, $k_s$ are functions of the variables we seek: receiver antenna position, $x_0^k$, k=1, 2, 3, and 3-dimensional receiver antenna attitude specified by the three Euler angles, $\alpha$, $\beta$, $\gamma$.

* * * * *